United States Patent
Chen et al.

(10) Patent No.: US 11,494,649 B2
(45) Date of Patent: Nov. 8, 2022

(54) RADIO ACCESS NETWORK CONTROL WITH DEEP REINFORCEMENT LEARNING

(71) Applicant: AT&T Intellectual Property I, L.P., Atlanta, GA (US)

(72) Inventors: Jie Chen, Watchung, NJ (US); Wenjie Zhao, Princeton, NJ (US); Ganesh Krishnamurthi, Danville, CA (US); Huahui Wang, Bridgewater, NJ (US); Huijing Yang, Princeton, NJ (US); Yu Chen, Pittsburgh, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 463 days.

(21) Appl. No.: 16/778,031

(22) Filed: Jan. 31, 2020

(65) Prior Publication Data
US 2021/0241090 A1    Aug. 5, 2021

(51) Int. Cl.
| G05B 13/02 | (2006.01) |
| G06E 1/00 | (2006.01) |
| G06G 7/00 | (2006.01) |
| G06N 3/08 | (2006.01) |
| G06N 3/04 | (2006.01) |
| H04W 24/08 | (2009.01) |
| H04W 84/04 | (2009.01) |

(52) U.S. Cl.
CPC ............ *G06N 3/08* (2013.01); *G06N 3/0445* (2013.01); *G06N 3/0454* (2013.01); *H04W 24/08* (2013.01); *H04W 84/042* (2013.01)

(58) Field of Classification Search
CPC ...... G06N 3/08; G06N 3/0454; G06N 3/0445; H04W 84/042; H04W 24/08
USPC .......................................................... 706/23
See application file for complete search history.

(56) References Cited

U.S. PATENT DOCUMENTS

| 10,019,470 B2 * | 7/2018 | Birdwell .............. G06N 3/0635 |
| 11,238,334 B2 * | 2/2022 | Baum ..................... G06F 7/785 |

(Continued)

OTHER PUBLICATIONS

Lowe, Ryan, Yi Wu, Aviv Tamar, Jean Harb, Pieter Abbeel and Igor Mordatch. "Multi-Agent Actor-Critic for Mixed Cooperative-Competitive Environments." ArXiv abs/1706.02275 (2017): n. pag.

(Continued)

*Primary Examiner* — Marceau Milord

(57) ABSTRACT

A processing system including at least one processor may obtain operational data from a radio access network (RAN), format the operational data into state information and reward information for a reinforcement learning agent (RLA), processing the state information and the reward information via the RLA, where the RLA comprises a plurality of sub-agents, each comprising a respective neural network, each of the neural networks encoding a respective policy for selecting at least one setting of at least one parameter of the RAN to increase a respective predicted reward in accordance with the state information, and where each neural network is updated in accordance with the reward information. The processing system may further determine settings for parameters of the RAN via the RLA, where the RLA determines the settings in accordance with selections for the settings via the plurality of sub-agents, and apply the plurality of settings to the RAN.

20 Claims, 5 Drawing Sheets

(56) References Cited

U.S. PATENT DOCUMENTS

| | | | |
|---|---|---|---|
| 2018/0174053 A1* | 6/2018 | Lin | G06N 3/049 |
| 2018/0314576 A1* | 11/2018 | Pasupuleti | H04L 67/10 |
| 2019/0303765 A1* | 10/2019 | Gou | G06N 3/084 |
| 2020/0334607 A1* | 10/2020 | Fadel | G06Q 10/06375 |
| 2021/0248514 A1* | 8/2021 | Celia | G06V 10/82 |
| 2021/0342836 A1* | 11/2021 | Celia | G06N 3/049 |

OTHER PUBLICATIONS

Zhang, Kaiqing, Zhuoran Yang, Han Liu, Tong Zhang and Tamer Başar. "Fully Decentralized Multi-Agent Reinforcement Learning with Networked Agents." ICML (2018).

Li, Rongpeng, Zhifeng Zhao, Qi Sun, I Chih-lin, Chenyang Yang, Xianfu Chen, Minjian Zhao and Honggang Zhang. "Deep Reinforcement Learning for Resource Management in Network Slicing." IEEE Access 6 (2018): 74429-74441.

Sun, Yaohua, Mugen Peng and Shiwen Mao. "Deep Reinforcement Learning-Based Mode Selection and Resource Management for Green Fog Radio Access Networks." IEEE Internet of Things Journal 6 (2018): 1960-1971.

Meng, Fan, Peng Chen, Lenan Wu and Julian Cheng. "Power Allocation in Multi-User Cellular Networks: Deep Reinforcement Learning Approaches." ArXiv abs/1901.07159 (2019): n. pag.

Fu, Haotian, Hongyao Tang, Jianye Hao, Zihan Lei, Yingfeng Chen and Changjie Fan. "Deep Multi-Agent Reinforcement Learning with Discrete-Continuous Hybrid Action Spaces." IJCAI (2019).

Mario Martin, "Reinforcement Learning Searching for optimal policies I: Bellman equations and optimal policies," Learning in Agents and Multiagents Systems, Universitat politècnica de Catalunya, Dept. LSI, (2011).

Chinchali, Sandeep, Pan Hu, Tianshu Chu, Manu Sharma, Manu Bansal, Rakesh Misra, Marco Pavone and Sachin Katti. "Cellular Network Traffic Scheduling With Deep Reinforcement Learning." AAAI (2018).

Nicholson, Chris. "A Beginner's Guide to Deep Reinforcement Learning." Pathmind, https://pathmind.com/wiki/deep-reinforcement-learning. (accessed Dec. 3, 2019).

Zhang, Wuyang, Russell Ford, Joonyoung Cho, Charlie Jianzhong Zhang, Yanyong Zhang and Dipankar Raychaudhuri. "Self-Organizing Cellular Radio Access Network with Deep Learning." IEEE INFOCOM 2019—IEEE Conference on Computer Communications Workshops (INOFCOM WKSHPS) (2019): 429-434.

Póczos, Barnabás, "Introduction to Machine Learning, Reinforcement Learning". Machine Learning Department, Carnegie Mellon School of Computer Science, http://www.cs.cmu.edu/~mgormley/courses/10601-s17/schedule.html. (2017).

Russell, Stuart J. and Andrew Zimdars. "Q-Decomposition for Reinforcement Learning Agents." ICML (2003).

Pageaud, Simon, Véronique Deslandres, Vassilissa Lehoux and Salima Hassas. "Multiagent Learning and Coordination with Clustered Deep Q-Network." AAMAS (2019).

\* cited by examiner

| State | Use Case | Reward | Action |
|---|---|---|---|
| Cell level:<br>Throughput, UL/DL volume, RF conditions, PRB/CCE utilization, active UEs, neighbor relations, handovers, frequency, bandwidth, user geographic distribution, historical information etc | Video Throughput Optimization | Video user DL throughput | Scheduler options, Handover offset configurations |
| | Coverage optimization | Connected users, Call retainability | Tilt, handover offsets |
| | Energy Saving | Energy cost and cluster harmonic throughput | Power on/off of different cells |
| UE level:<br>UE service type (video/non-video), RF condition, UE throughput, etc | UE Throughput and Fairness | Cell level harmonic throughput and bottom 10% user throughput | Scheduler options |
| | Load Balancing | Cluster level harmonic throughput | Handover offset configurations |

RADIO ACCESS NETWORK CONTROL WITH DEEP REINFORCEMENT LEARNING

The present disclosure relates generally to software defined networking and self-optimizing networks, and more particularly to apparatuses, computer-readable media, and methods for determining settings for parameters of a radio access network via a reinforcement learning agent comprising a plurality of sub-agents.

BRIEF DESCRIPTION OF THE DRAWINGS

The present disclosure can be readily understood by considering the following detailed description in conjunction with the accompanying drawings, in which:

FIG. 3 illustrates a chart of example use cases that may be associated with different sub-agents of a reinforcement learning agent of the present disclosure;

To facilitate understanding, identical reference numerals have been used, where possible, to designate identical elements that are common to the figures.

DETAILED DESCRIPTION

Figure 1:
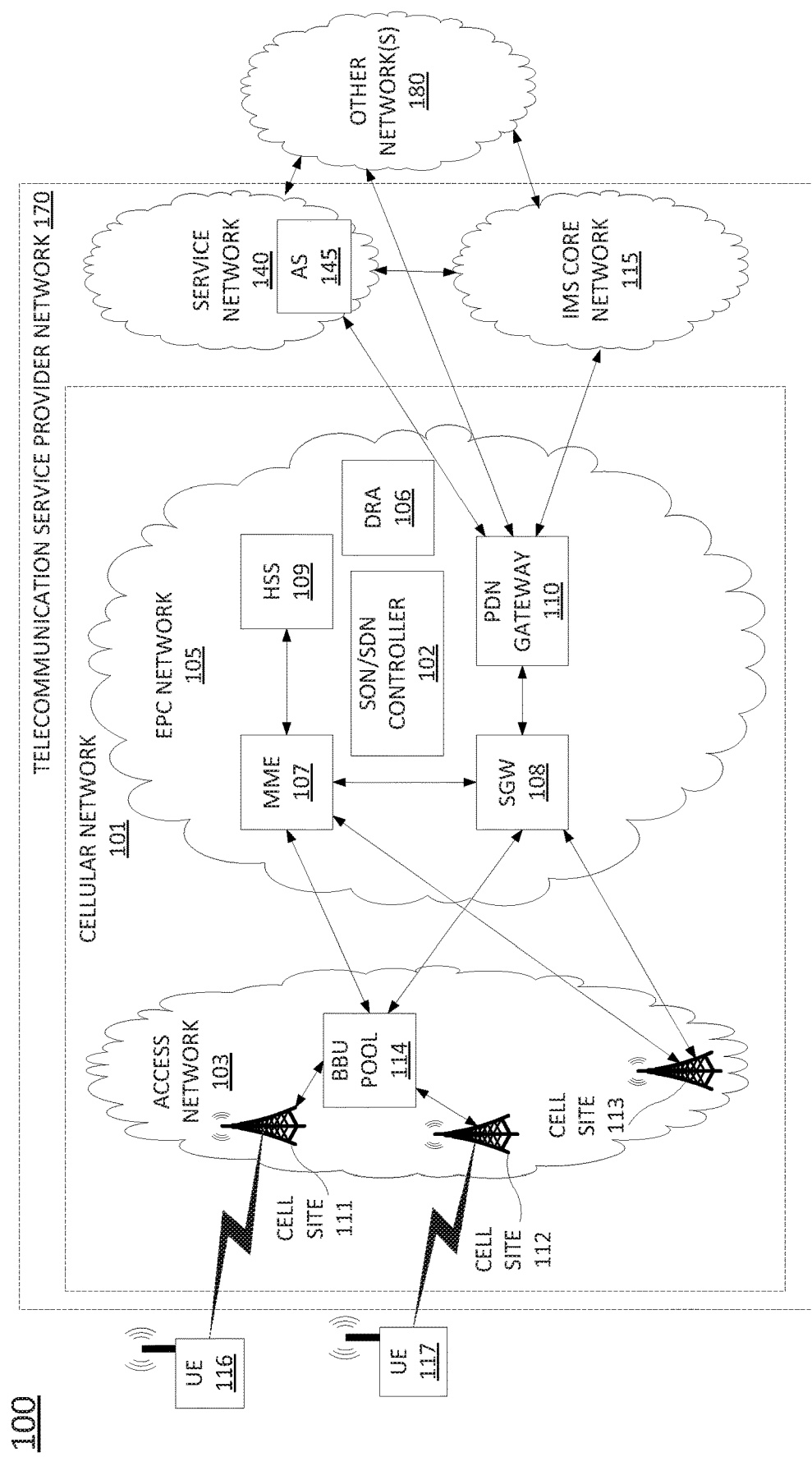
FIG. 1 illustrates an example of a system including a telecommunications service provider network, according to the present disclosure.

Examples of the present disclosure include apparatuses, non-transitory (i.e., tangible and/or physical) computer-readable media, and methods for determining settings for parameters of a radio access network via a reinforcement learning agent comprising a plurality of sub-agents. For instance, in one example, a processing system including at least one processor may obtain operational data from a radio access network, format the operational data into state information and reward information for a reinforcement learning agent, processing the state information and the reward information via the reinforcement learning agent, where the reinforcement learning agent comprises a plurality of sub-agents, where each of the plurality of sub-agents comprises a respective neural network of a plurality of neural networks, where each of the plurality of neural networks encodes a respective policy for selecting at least one setting of at least one parameter of the radio access network to increase (e.g., raise or maximize) a respective predicted reward in accordance with the state information, and where each of the plurality of neural networks is updated in accordance with the reward information. The processing system may further determine a plurality of settings for a plurality of parameters of the radio access network via the reinforcement learning agent, where the reinforcement learning agent determines the plurality of settings in accordance with a plurality of selections for the plurality of settings via the plurality of sub-agents, and apply the plurality of settings to the radio access network, wherein the plurality of settings includes the at least one setting and the plurality of parameters includes the at least one parameter.

In particular, examples of the present disclosure describe a deep reinforcement learning (DRL) framework with direct online training for radio access network (RAN) optimization in a mobile network. In one example, the present disclosure includes a real-time data streaming process to digest live mobile network measurements and extract useful network status/performance information via a performance indicator composer/publisher in a production network. In one example, the present disclosure also utilizes vendors' open API(s) to adjust network configurations to provide closed-loop RAN control. In one example, an autonomous reinforcement learning agent (RLA) (e.g., implemented via deep reinforcement learning (DRL)) engages in self-directed learning of policies represented/encoded by neural networks, which automatically evolve with the changes/shifts of the RAN environment. In one example, the RLA provides a unified framework to learn optimal policies for various RAN parameters that are controllable in a self-optimizing network (SON) environment, and resolves potential conflicts raised by different policies.

To illustrate, in a self-organizing network (SON) architecture, there may be thousands of configurations for controlling various aspects of a RAN. For example, Media Access Control (MAC) schedulers may allocate radio resources to mobile devices based on their radio frequency (RF) conditions and average throughput. There are several options for the scheduler to trade network efficiency for fairness. Thus, an intelligent selection from among the configuration options based on network status may improve the overall user performance and provide benefits for specific services such as streaming videos, augmented reality (AR) and/or virtual reality (VR) games, video-conferencing, etc. Another RAN configuration is the handover (HO) parameters for optimal load balancing. By changing thresholds based on observed traffic imbalance, the network may offload traffic from overloaded cells to under-utilized cells to improve overall throughput. However, as the traffic load/distribution on cells changes, scheduling algorithms may also need to be adjusted accordingly.

An RLA of the present disclosure may select settings for multiple configurable RAN parameters in a holistic way. There are several challenges in simultaneously selecting settings for different parameters. For instance, complexity may grow exponentially with the increase in the number of eNodeB/cell configurations and potential options. In addition, user traffic is highly dynamic and may be difficult to predict. Thus, models built on historical data may quickly become obsolete. Moreover, traffic may also be re-distributed by various parameter setting changes. However, while feedback to assess the impact of parameter setting changes may be desirable, network status may only be partially observable, and a view of the network may be delayed due to the limitations of network measurement reports.

SON algorithms for RANs have previously been developed following the approach of expert systems. This approach may require in-depth domain knowledge about a RAN, and may result in rigid rules that do not perform well under dynamic mobile conditions. In addition, the development cycle of each rule-based SON algorithm could last months or years and involve significant manual work. At the same time, it may be challenging to specify all rules for a complex network, with potentially thousands of rules to manage. Furthermore, the performance may be less than ideal, e.g., due to unpredictable traffic changes and potentially conflicting effects of different SON actions.

More recently, machine learning (ML)-based SON algorithms have been explored. One approach involves supervised learning. For instance, based on logs of historical data and actions performed in the network, regression/classification models may be built with random forest, gradient boosting, and other deep learning tools to predict the impact of configurations on the network. However, these methods may be limited by infrequent actions implemented in the real network and missing logs of actions taken by engineers. It may be difficult or nearly impossible to understand the causal effect when there are multiple changes from different algorithms. Furthermore, the trained model is usually tied to the data collected, and may become invalid whenever changes happen in the network environment. Sometimes, the impact of configuration changes may last longer than the sampling period and may mixed with other changes to the network. Supervised learning may generally perform poorly with these types of delayed outcomes.

Reinforcement learning (RL)-based approaches to aspects of RAN control have been proposed but have focused on individual use cases. In addition, research has generally been limited to simulation/emulation environments. However, due to the major differences between simulation/emulation environment and a real wireless network, the models cannot be utilized in real networks directly. Instead of conducting offline analysis with supervised learning, examples of the present disclosure apply reinforcement learning (RL) to explore different configurations in real-time and update policies based upon the outcomes of the changes to determine the optimal configurations (e.g., parameter settings) of the network. In one example, a closed loop control framework is provided, which may include: a live data digestion unit, a performance indicator (or "key" performance indicator (KPI)) composer and publisher, a network status and performance monitor, a reinforcement learning agent (RLA) or deep reinforcement learning agent (DRLA) (which decides the configurations based on network status), a RAN configuration control interface, and a RAN configuration controller (e.g., a SON/software defined network (SDN) controller).

In one example, to formulate RAN optimization and control as a reinforcement learning problem the present disclosure may set "state" as the network status, such as traffic volume, user amount, physical resource block (PRB) and/or control channel element (CCE) utilization, etc. "Reward" may be set as network performance indicators, or KPIs, such as mobile device/user equipment (UE) harmonic throughput, throughput difference among mobile devices, retainability, accessibility, etc. "Action" may be set as configuration options/settings for different configurable parameters of the RAN, including: MAC scheduler algorithms, handover offsets, power on/off, transmit power, tilt, etc.

Different use cases may fit in the same deep reinforcement learning (DRL) framework with slightly different (state, reward, action) sets. In one example, an RLA may implement multiple different use cases via different sub-agents, e.g., each comprising an RLA with a different (state, reward, action) set. For example, a first sub-agent may be deployed for a first "use case" of "UE throughput and fairness," while a second sub-agent may be deployed for a second "use case" of "managing energy saving opportunities." When conflicts arise from different sub-agents, the RLA (e.g., a centralized arbitrator component thereof) may define a centralized reward as a weighted summation of individual objectives, which may affect the policy learning of individual sub-agents. In one example, different centralized rewards (e.g., one for each sub-agent) comprising weighted summations of individual objectives may be utilized (e.g., with different weightings). Thus, actions of different sub-agents may affect the policy learning and the actions of a given sub-agent.

In one example, different sub-agents may also have action spaces which relate to a same parameter. In other words, two or more different sub-agents may attempt to control a same parameter of the RAN, potentially with different selected settings for the parameter. In such cases, the RLA may arbitrate between competing parameter setting selections (if any). For example, the RLA may select one of the settings (e.g., for a parameter having a discrete parameter space), or may select a setting that is based on an average, weighted average, or the like (e.g., for a parameter having a continuous parameter space).

Examples of the present disclosure thus provide an integrated framework (e.g., with multiple DRL sub-agents) for RAN optimization and control. Notably, the corresponding improvements in RAN performance translate into capital saving in network operations. The present disclosure can be utilized to localize RAN configurations under different traffic scenarios and neighboring cell interference patterns to maximize end user experience for high-demand uses, such as streaming video and others. The presented disclosure enables the centralized optimization of network configurations (e.g., at the cell and/or cell cluster level) and resolves potential conflicts of different policies of different sub-agents pursuing respective SON goals. In addition, the present disclosure enables rapid algorithm tuning and significantly reduces the time and cost of SON algorithm development. An RLA can be trained to automate RAN operations, thus increasing network availability, reducing recovery time, and improving customers' quality of experience (QoE).

The goal of reinforcement learning (RL) techniques is to increase (e.g., raise or maximize) the reward in the long term; thus, RL accounts for not just the immediate reward, but also the long term consequences after taking an action. For example, after changing a scheduling algorithm, the network state may change dramatically and trigger other configuration adjustments in subsequent time periods (e.g., changes to handover offset(s), base station, sector, and/or antenna array power on/off states, etc.). Therefore, the impacts of different actions last multiple time periods. Reinforcement learning tends to better account for delayed and long-term reward (e.g., as compared to other machine learning (ML)-based techniques). More particularly, in one embodiment an agent is expected to maximize the return, which is the discounted sum of all future rewards. To illustrate, for a given agent (e.g., a "sub-agent" of a multi-sub-agent RL process of the present disclosure) Equation 1 gives the return $G_t$, the discounted sum of future rewards.

$$G_t \sum_{i=t}^{\infty} \gamma^{i-1} R_{i+1}(S_i, A_i), 0 < \gamma < 1 \qquad \text{Equation 1}$$

In Equation 1, $R_{t+1}$ is the reward at time t+1, given the states $S_t$ after taking action $A_t$ at time t, and $\gamma$ is a discount factor between 0 and 1.

Examples of the present disclosure do not make explicit assumptions about inner workings of the radio access network (the environment). Instead, an agent learns both the environment and the optimal policy (or policies) simultaneously by interacting with the environment. In other words, Q-learning is a type of "model-free" reinforcement learning. At each time step, an agent may select the best action according to the state. To evaluate how "good" a certain action is, the Q-function (or action-value function) is given by Equation 2, where π is the policy.

$$Q(s, a; \theta) \approx \max_{\pi} \mathbb{E}[G_t | S_t = s, A_t = a, \pi]$$  Equation 2

In one example, this function may be approximated using a neural network, e.g., a deep neural network (DNN) with parameters θ. In one example, a deep reinforcement learning (DRL) algorithm that may be used in accordance with the present disclosure is a double deep q network (DDQN) with memory replay and n-step temporal difference (TD) learning, which is demonstrated to achieve desirable results. In one example, agents (or "sub-agents," as referred to herein) may be pre-trained with past data points collected from a radio access network environment. With the historical data (including actions taken by human operators and/or or expert automated systems), the sub-agent(s) can be guided and trained more efficiently. In use, each sub-agent may be trained continuously, and may adjust the respective policy π as the environment changes. It should be noted that although examples herein are described primarily in connection with Q-learning, in various other examples the present disclosure may utilize other "model-free" reinforcement learning techniques, such as: a deep Q-learning algorithm (or DQN "deep Q-network"), a deep deterministic policy gradient (DDPG) algorithm, an asynchronous advantage actor-critic (A3C) algorithm, or the like. These and other aspects of the present disclosure are discussed in greater detail below in connection with the examples of FIGS. 1-5.

To better understand the present disclosure, FIG. 1 illustrates an example network, or system 100 in which examples of the present disclosure may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of cell sites 111-113 may comprise a 5G "new radio" (NR) base station.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one example, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter Routing Agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more service functions in accordance with the present disclosure. For instance, AS 145 may comprise a reinforcement learning agent (RLA), a data pre-processing unit, or other components as described herein. Although a single application server, AS 145, is illustrated in service network 140, it should be understood that service network 140 may include any number of components to support one or more services that may be provided to one or more subscribers, customers, or users by the telecommunication service provider network 170.

Figure 5:
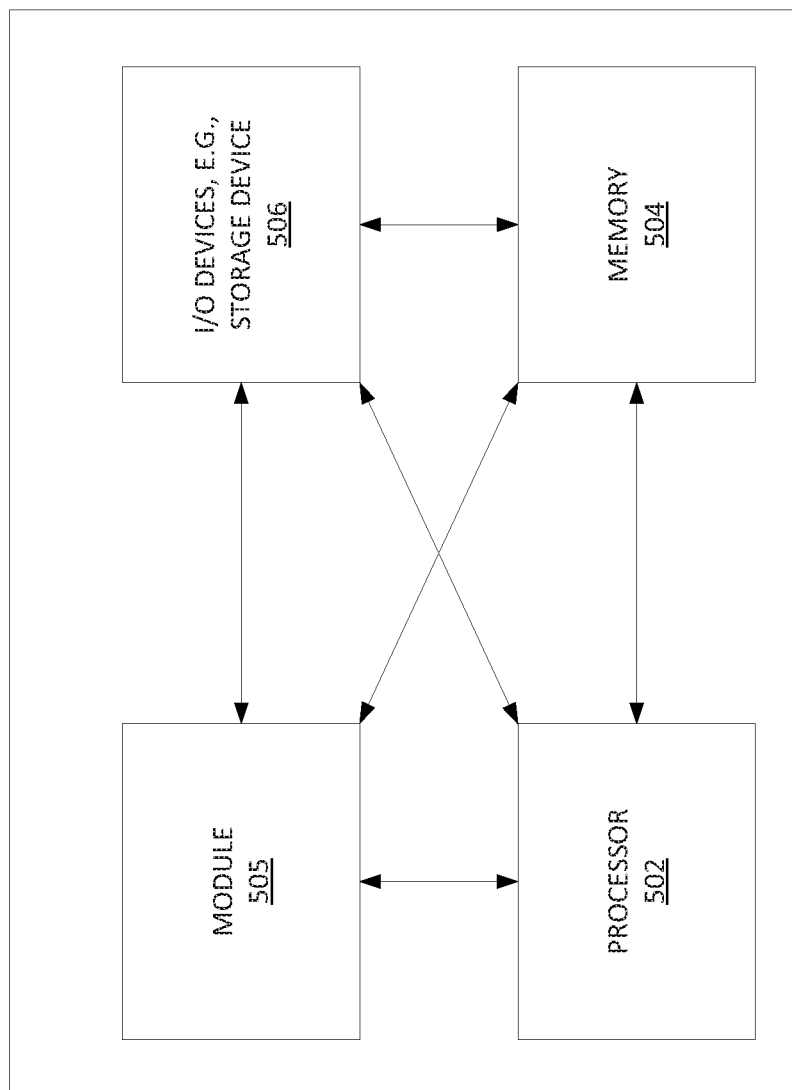
FIG. 5 illustrates a high-level block diagram of a computing device specifically programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below, and which may include central processing units (CPUs), graphics processing units (GPUs), programmable logic devices (PLDs), and so forth) or multiple computing devices collectively configured to perform various steps, functions, and/or operations in accordance with the present disclosure.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 102.

In one example, SON/SDN controller 102 may function as a self-optimizing network (SON) orchestrator that is responsible for activating and deactivating, allocating and deallocating, and otherwise managing a variety of network components. In one example, SON/SDN controller 102 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

As noted above, AS 145 may operate as a reinforcement learning agent (RLA), e.g., comprising a plurality of sub-agents for determining settings for parameters of a radio access network, as described herein. To illustrate, in one example, AS 145 may obtain performance indicators (or state information and reward information derived from such performance indicators) from any one or more of cell sites 111-113 in access network 103 (e.g., a radio access network (RAN)), and may process the state information and reward information via the plurality of sub-agents in order to determine a plurality of settings for a plurality of parameters of one or more of the cell sites 111-113 and/or access network 103 in accordance with a plurality of selections for the plurality of settings via the plurality of sub-agents. In one example, AS 145 may apply the plurality of settings via one or more instructions to SON/SDN controller 102. For instance, SON/SDN controller 102 may access cell sites 111-113 and/or any one or more components thereof, such as eNodeB's, remote radio heads (RRHs), BBU pool 114, etc. via one or more respective control interfaces (e.g., vendor APIs) to remotely configure the settings for the plurality of parameters.

The various parameters may include cell site scheduling options, cell handover offset configurations, sector tilt, power on/off settings for cells, sectors, and/or RRHs, a number of BBUs (e.g., from BBU pool 114), and so on. The performance indicators, which may be further formatted into state information and/or reward information may include cell level performance indicators, such as throughput, uplink and/or downlink volume/throughput, video user downlink throughput (video specific), radio frequency (RF) conditions, physical resource block (PRB) and/or control channel element (CCE) utilization, active UEs, neighbor relations, handovers, frequency, bandwidth, user geographic distribution, historical information, reference signal received power (RSRP), reference signal received quality (RSRQ), and/or channel quality information (CQI) distribution, timing advance (TA) distribution, cell bitrate, harmonic UE throughput, throughput gap (difference between maximum and minimum UE throughputs), worst throughput, cluster harmonic throughput, a weighted sum of the foregoing, etc.

In one example, AS 145 may obtain performance indicators directly from RAN components. For instance, eNodeBs may collect performance indicators which may be obtained via vendor API(s) via push or pull. The performance indicators may be further processed, for instance, by averaging, sampling, etc. The respective performance indicators, as obtained from the RAN component(s) and/or as further processed, may then be utilized as state information, reward information, or both, depending upon the particular use cases and the configuration(s) of the RLA, the sub-agents of the RLA, etc.

To illustrate, a first sub-agent may be deployed to address UE throughput and fairness. For example, the first sub-agent may utilize as "state information" the performance indicators of throughput, traffic volume, PRB and/or CCE utilization, active UEs, RSRP, RSRQ, and/or CQI distribution, TA distribution, cell bitrate, and so forth, and may utilize as "reward information" performance indicators comprising any one or more of harmonic UE throughput, throughput gap (difference between maximum and minimum UE throughputs), worst throughput, a weighted sum of the foregoing, etc. The possible action(s) that may selected by the first sub-agent may be a selection from among five different scheduling algorithms that are available to apply at a cell site (e.g., at an eNodeB). For instance, five vendor-provided scheduling algorithms may broadly comprise different strategies for balancing between fairness and efficiency. It should be noted that in accordance with the present disclosure, the selection of an "action" via reinforcement learning (RL) may comprise a selection of a setting for at least one RAN parameter, e.g., a parameter that is configurable/adjustable by remote instruction to the RAN component(s).

On the other hand, a second sub-agent that is tasked with managing energy saving opportunities may utilize as "state information" the performance indicators of throughput, uplink and/or downlink volume, RF conditions, PRB/CCE utilization, active UEs, neighbor relations, handovers, frequency, bandwidth, user geographic distribution, historical information, and so forth, and may utilize as "reward information performance indicators comprising any one or more of energy cost, cluster harmonic throughput, etc. The possible action(s) that may selected by the second sub-agent may comprise power on/off options for one or more of cell sites 111-113, the number of active RRHs and/or BBUs from BBU pool 114, etc.

It should be noted that different sub-agents may have different combinations of (state, reward, action) depending upon the purpose(s) and configuration(s) of the different sub-agents. It should also be noted that in accordance with the present disclosure, a reinforcement learning agent (RLA) may comprise a plurality of sub-agents, which may have different rewards, and which may select different actions with respect to a given state. A selected action of one sub-agent may affect the reward that accrues to a different sub-agent, and vice versa. In addition, in some examples, different sub-agents may have associated actions which may relate to a same parameter. For instance, a first sub-agent may select a scheduling algorithm "4" in accordance with the policy (e.g., the DNN) of the first sub-agent, while a second sub-agent may select a scheduling algorithm "2" in accordance with the policy/DNN of the second sub-agent.

In one example, since it is not possible to implement two different scheduling algorithms simultaneously at same cell site, the RLA may arbitrate between competing parameter setting selections (if any). For example, a network operator may give priority ratings to different sub-agents such that a goal of coverage optimization (implemented via a first sub-agent) is relatively more important (and provides greater impact to the selection of a parameter setting) as compared to a goal of load balancing (implemented via a second sub-agent). In this case, if there are only two sub-agents having "actions" regarding the scheduling algorithm, the RLA may choose to implement scheduling algorithm "4," since the sub-agent with a greater priority rating has selected scheduling algorithm "4." If there are more than two sub-agents, the RLA may choose to implement a scheduling algorithm with the most selections among sub-agents, or according to a weighted, top-selected scheduling algorithm (e.g., selections weighted based upon the priority ratings of the different sub-agents). It should also be noted that a similar arbitration process may be applied to any parameters with a discrete parameter space (e.g., power on/off settings, or the like) for which two or more sub-agents may attempt to select settings.

Similarly, at a given state at a given time, a first sub-agent may select an "action" (e.g., a parameter setting) of 6 degree downtilt for a cell site sector, while a second sub-agent may select an 8 degree downtilt for the same sector. In this case, the RLA may select an intermediate setting for the sector tilt parameter, e.g., 7 degrees downtilt. In another example, the RLA may select a setting that comprises a weighted average of selections from two or more sub-agents that have selected parameter settings for the same parameter. For instance, a network operator may give priority ratings to different sub-agents such that a goal of coverage optimization (implemented via a first sub-agent) is relatively more important (and provides greater impact to the selection of a parameter setting) as compared to a goal of load balancing (implemented via a second sub-agent). It should also be noted that a similar arbitration process may be applied to any parameters with a continuous parameter space (e.g., handover offsets, or the like) for which two or more sub-agents may attempt to select settings. In one example, even for parameters with continuous parameter spaces, the RLA make select between sub-agents to decide each time which sub-agent to follow. In other words, the action of the overall RLA is to determine which sub-agent solution to follow.

In another example, the RLA may combine two (or more) sub-agents to avoid conflicting values of the parameter setting/action outputs. In other words, a plurality of sub-agents may be collapsed into a single agent, with the actions(s) and reward defined accordingly. In still another example, each sub-agent may be assigned/designated to control a cluster of cells/eNodeBs, so that multiple of sub-agents work together to improve the overall regional/zone performance. While a universal model for a whole market/country may be too large to control, cells are also affected by neighbor cells. Therefore, allowing sub-agents to control local cells and work together with shared rewards accounts for inter-cell impacts.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, SON/SDN controller 102 may be spilt into separate components to operate as a SON orchestrator and a SDN controller, respectively. Similarly, although the SON/SDN controller 102 is illustrated as a component of EPC network 105, in another example SON/SDN controller 102, and/or other network components may be deployed in an IMS core network 115 instead of being deployed within the EPC network 105, or in other portions of system 100 that are not shown, while providing essentially the same functionality. Similarly, AS 145 may be alternatively deployed as an additional component of EPC network 105, access network 103, etc. In on example, functions of different components may be combined into a single device, or into a lesser number of devices than as shown in FIG. 1. For instance, in one example, functions described above with regard to AS 145 may alternatively or additionally be performed by SON/SDN controller 102. For example, SON/SDN controller 102 may include a reinforcement learning agent (RLA) and/or data pre-processing unit, e.g., addition to other functions of SON/SDN controller 102.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 145 of FIG. 1 may represent an application function (AF) for determining settings for parameters of a radio access network via a reinforcement learning agent comprising a plurality of sub-agents, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
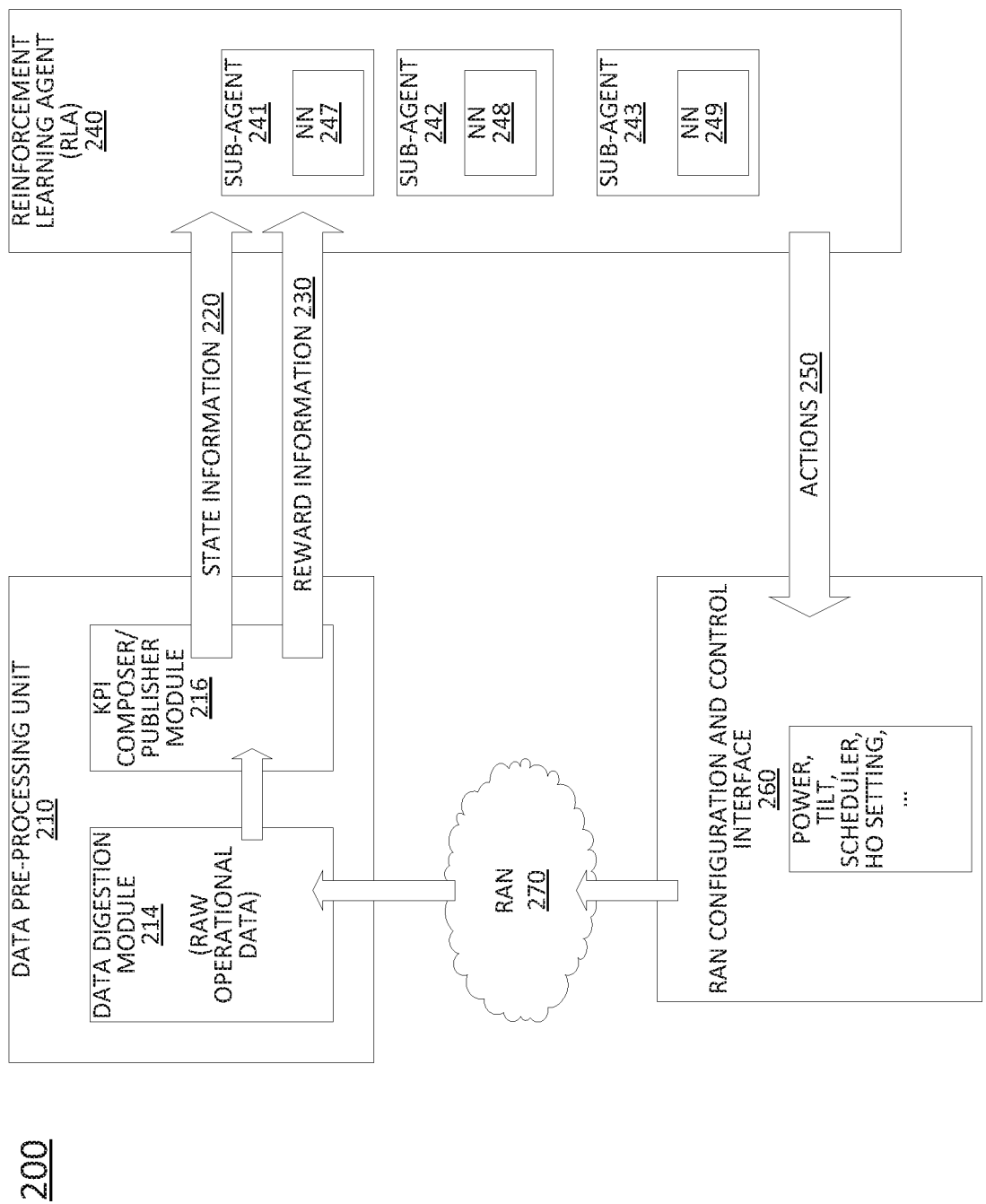
FIG. 2 illustrates an example system architecture, according to the present disclosure.

FIG. 2 illustrates an example system framework, or architecture 200 of the present disclosure. As illustrated in FIG. 2, the system architecture 200 includes a radio access network (RAN) 270, which may include one or more cells and may comprise equipment for one or more types of radio access technologies, e.g., 3G, 4G/LTE, 5G-SA, 5G-NSA, etc. In one example, components of RAN 270 may collect raw operational data of the RAN, such as base station equipment operating temperatures (e.g., BBU temperatures, operational states (e.g., active/inactive, on/off, etc.), device voltages, raw call trace records (CTRs), information regarding mobile devices detected by a base station, such as IMEI/IMSI, the numbers of active mobile devices, the number of active sessions per sector, the number of active sessions per mobile device, transmit power, receive power, RSRP measurement data obtained from mobile devices, information regarding a currently active scheduling algorithm, a currently active handover setting, etc.). In accordance with the present disclosure, any operational data that may be generated by and/or collected by components of RAN 270 and which may be made accessible by equipment vendors may be utilized as raw operational data.

As further illustrated in FIG. 2, the raw operational data may be collected by data digestion module 214 of data pre-processing unit 210 from the components of RAN 270. For instance, the raw operational data may be fed as reports, which may be generated periodically or based on events, to the data digestion module 214. The data digestion module 214 may parse the raw operational data to extract information that is useable by the KPI composer/publisher module 216. For instance, not all of the raw operational data obtained by data digestion module 214 may be relevant to the reinforcement learning agent (RLA) 240. Thus, in one example, data digestion module 214 may be tasked with initial data filtering to pass relevant data to KPI composer/publisher module 216 and to exclude data that will not be used. In one example, the data pre-processing unit 210 comprises a collection process that reads live operational data, filters the operational data based on a configuration file (e.g., a configuration file that is particular to one or more cells of the RAN 270 that are of interest), and appends different events into corresponding event queues.

KPI composer/publisher module 216 may derive performance indicators (e.g., KPIs) based on the raw operational data (or at least a portion thereof, as provided by data digestion module 214). In one example, KPI composer/publisher module 216 may also reformat the KPIs into state information 220 and reward (objective) information 230 as inputs for the RLA 240. The state information 220 may comprise KPIs reflecting status of the RAN 270, such as PRB utilization, RF distribution, etc. The reward information 230 may comprise KPIs indicating the network performance, such as harmonic UE throughput, etc. It should be noted that in one example, the reward information 230 may include different sets of reward information for different sub-agents 241-242 of the RLA 240. In one example, the state information 220 may be used uniformly by the different sub-agents 241-243. However, in another example, the state information 220 may include different sets of KPIs representing the state of RAN 270 in different ways for respective sub-agents 241-243. It should also be noted that depending upon the particular use-case (e.g., the purpose or intended function of a sub-agent) a KPI may be part of the state information 220 or the reward information 230. In one example, a network operator may define KPIs by specifying fields, formulas, and aggregations (e.g., in JavaScript Object Notation (JSON) format, or the like), and may apply user-defined functions before and/or after aggregation. In one example, KPI calculation intervals are also configurable by the network operator.

As further illustrated in FIG. 2, the RLA 240 includes sub-agents 241-243. Each of the sub-agents 241-243 comprises a respective neural network (NN) 247-249 (e.g., each comprising a deep neural network (DNN)). In accordance with the present disclosure sub-agents 241-243 may utilize reinforcement learning techniques, such as: a deep Q-learning process (or DQN "deep Q-network"), a double deep Q-learning process (or double DQN (DDQN)), a deep deterministic policy gradient (DDPG) process, an asynchronous advantage actor-critic (A3C) process. Each of the neural networks 247-249 is updated with the reward information 230 (or a respective portion thereof that is relevant to the particular sub-agent) and is trained to determine an optimal "action" based upon the state information 220 (or a respective portion thereof that is relevant to the particular sub-agent). In other words, each of the plurality of neural networks 247-249 is to encode (and learn through RL) a respective policy for selecting at least one setting of at least one parameter of the radio access network (an "action") to increase (e.g., raise or maximize) a respective predicted reward in accordance with the state information. Thus, each of the sub-agents 241-243 may output, via the respective neural networks 247-249 respective selection(s) for respective setting(s) of respective parameter(s) of RAN 270.

In one example, the present disclosure utilizes a data streaming platform for distributing state information 220 and reward information 230 to sub-agents 241-243. For instance, Apache Kafka (herein referred to as Kafka) is a streaming platform that enables applications to stream messages to "topics". Topics in Kafka are message queues where each message being published to the topic is published to all the applications that are subscribed to the topic. These publishers act as producers, and the subscribers are consumers. Such producers and consumers may be arranged to build complex real-time streaming data pipeline architectures. Kafka allows the messages in a topic to be distributed or duplicated across consumers. If the consumers belong to the same consumer group then the messages are distributed across the different consumers in the consumer group; if the consumers belong to different consumer groups then the Kafka messages are duplicated across the different consumers. Thus, sub-agents utilizing the same state information 220 (e.g., the same portion(s) thereof), may be consumers in a same consumer group and may subscribe to a same "topic." For instance, KPI composer/publisher module 216 may package relevant portion(s) of state information 220 and publish to one or more topics for distribution to sub-agents 241-243 as subscribers/consumers. Similarly, sub-agents 241-243 may subscribe to a topic for the relevant portions of reward information 230. However, in another example, aspects of state information 220 and reward information 230 may be mixed, matched, and published to respective topics for individual sub-agents or groups of sub-agents. It should be noted that examples of the present disclosure may utilize other streaming platforms of the same or a similar nature to distribute state information 220 and reward information 230 to the sub-agents 241-243 in operation as part of RLA 240.

As noted above, in one example, multiple sub-agents may have the ability to affect the selection of a setting for a same parameter. As such, there may be conflicts between and among different setting selections for a same parameter that are provided by different sub-agents. For instance, sub-agent 241, via NN 247, may output a selection of a tilt angle for an antenna array, or remote radio head (RRH) for a given cell sector of 6 degrees downtilt, while sub-agent 242, via NN 248, may select 8 degrees downtilt for the same antenna array. In this case, the RLA 240 may select an intermediate setting for the sector tilt parameter, e.g., 7 degrees downtilt. In another example, the RLA 240 may select a setting that comprises a weighted average of selections from two or more sub-agents that have selected parameter settings for the same parameter. It should also be noted that a similar arbitration process may be applied to any parameters with a continuous parameter space (e.g., handover offsets, or the like) for which two or more sub-agents may attempt to select settings. Similarly, a weighted majority arbitration may be applied among setting selections from different sub-agents for a parameter having a discrete parameter space. In still another example, control of each parameter may be uniquely assigned to a sub-agent, and there is no competition for control of the parameter settings. In this case, the policies and selection of parameter settings by each sub-agent may still be informed by a reward system that accounts for how other sub-agents may act from a given state. For example, a multi-agent deep deterministic policy gradient (MADDPG) architecture may contain a centralized critic and decentralized actor neural networks (e.g., sub-agents). The centralized critic may estimate the long term reward considering all actions from the actors and overall system states, while each actor may observe full or partial system states and determine a subset of configurations to change locally. In still another example, the RLA 240 may include a plurality of critics, where each of the plurality of critics is for a corresponding one of the sub-agents 241-243, and where each of the plurality of critics comprises a quality function that accounts for a policy of the corresponding sub-agent and at least one action (or "parameter selection") of at least one other sub-agent from among sub-agents 241-243.

In any case, the plurality of settings for the plurality of parameters (e.g., as determined by RLA 240 in accordance with a plurality of selections for the plurality of settings via the plurality of sub-agents), may be provided to RAN configuration and control interface 260 as one or more actions 250. In one example, the RAN configuration and control interface 260 interprets parameter setting selections into configuration adjustment messages, which may then be sent via vendor configuration open APIs to the corresponding components of RAN 270. In one example, the RAN configuration and control interface 260 may comprise a SON/SDN controller, or the like. It should be noted that as the parameter setting changes are made, the components of RAN 270 may continue to self-collect and report raw operational data to data digestion module 214 of data pre-processing unit 210, which may be filtered, provided to KPI composer/publisher module 216, processed into state information 220 and reward information 230, and so forth. It should also be noted that although components of the system architecture 200 are illustrated as separate entities, in one example, one or more aspects may be deployed on a single physical device, or a single virtual machine that may be physically deployed in multiple hardware host devices. For instance, any two or more of data preprocessing unit 210, RLA 240, and/or RAN configuration and control interface 260 may all be deployed on a single device or platform (such as AS 145 or SON/SDN controller 102 of FIG. 1, for example).

FIG. 3 illustrates a chart 300 with example use cases that may be associated with different sub-agents of a reinforcement learning agent and the respective state information, reward information, and actions that may relate to the different use cases. For instance, as illustrated in FIG. 3, chart 300 includes various performance indicators (e.g., KPIs) that may comprise state information for RL agents (sub-agents), e.g., one for each respective use case. The state information may include cell-level and mobile device/UE-level KPIs. Each of the use cases may be associated with a respective agent (or sub-agent) with a neural network approximating the Q-function and having different reward-action sets. For instance, for a first use case of "video throughput optimization," the "reward" may comprise "video user downlink (DL) throughput," and the "action" may comprise scheduler options (e.g., selecting from among available MAC scheduler algorithms), handover offset configurations, or both. For a second use case of "coverage optimization," the "reward" may be a composite of a number of connected users and a call retainability metric, and the corresponding "action" may comprise antenna array/RRH tilt, handover offset configurations, or both. Chart 300 further illustrates three additional example use cases of "energy savings," "mobile device/UE throughput and fairness," and "load balancing," each with associated reward-action sets. It should be noted that the state information may be the same for all of the use cases (e.g., shared state information). However, in one example, different use cases may have (sub-)agents and/or neural networks that expect different sets of state information. As further noted above, the present disclosure may jointly implement multiple uses cases via different sub-agents of a reinforcement learning agent (RLA), where the RLA may coordinate among actions of different sub-agents (e.g., conflicting parameter setting selections) by weighted average, weighted majority selection, or the like.

Figure 4:
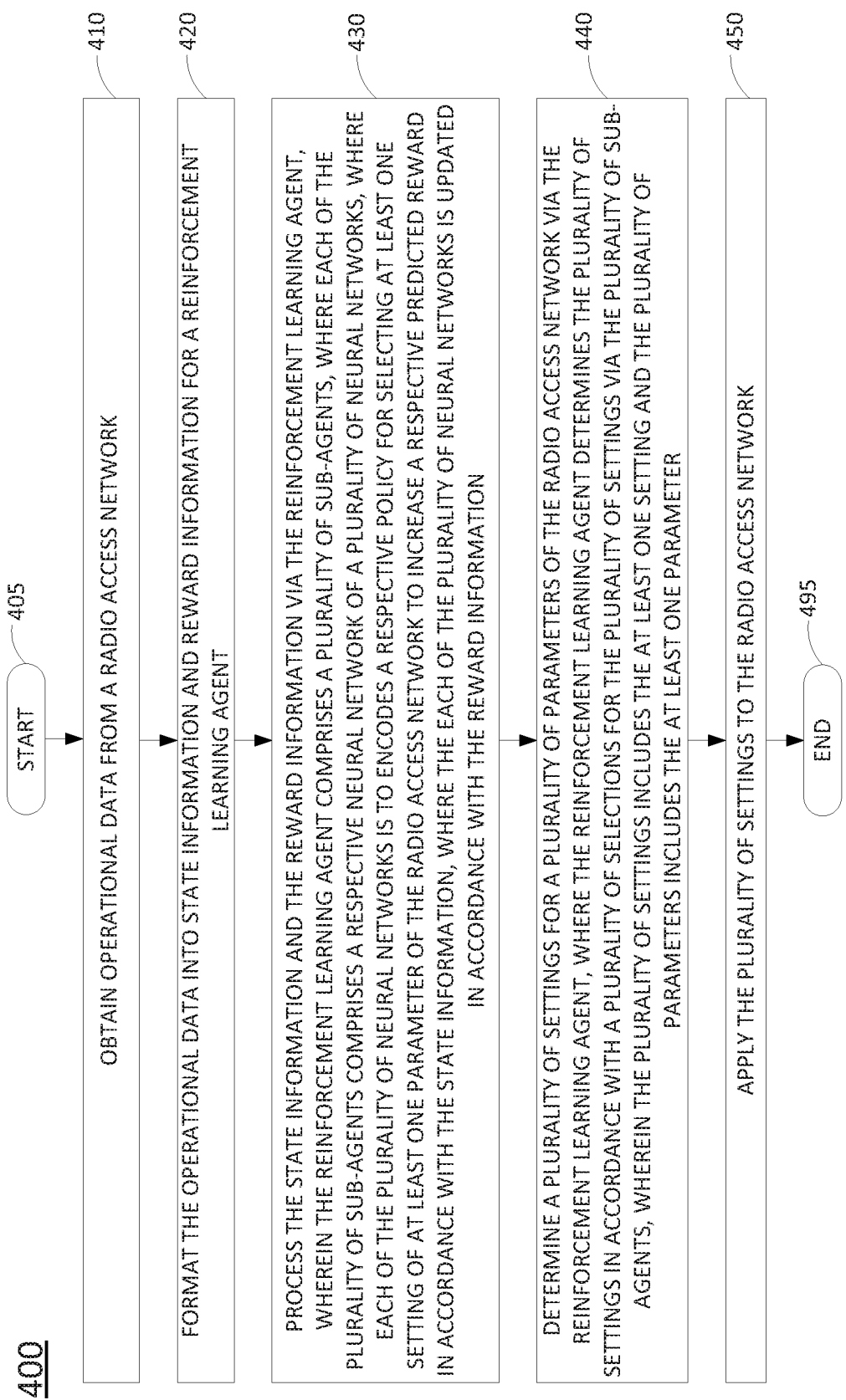
FIG. 4 illustrates a flowchart of an example method for determining settings for parameters of a radio access network via a reinforcement learning agent comprising a plurality of sub-agents.

FIG. 4 illustrates, a flowchart of an example method 400 for determining settings for parameters of a radio access network via a reinforcement learning agent comprising a plurality of sub-agents. In one example, steps, functions and/or operations of the method 400 may be performed by a device as illustrated in FIG. 1, e.g., by AS 145 or SON/SDN controller 102, and/or or any one or more components thereof, or by AS 145 or SON/SDN controller 102, and/or any one or more components thereof in conjunction with one or more other components of the system 100, such as one or more of AS 145, SON/SDN controller 102, cell sites 111-113, BBU pool 114, and so forth. In one example, the steps, functions, or operations of method 400 may be performed by a computing device or processing system, such as computing system 500, and/or a hardware processor element 402 as described in connection with FIG. 5 below. For instance, the computing system 400 may represent at least a portion of an application server or other device(s) in accordance with the present disclosure. For illustrative purposes, the method 400 is described in greater detail below in connection with an example performed by a processing system. In one example, the steps, functions, or operations of method 400 may be performed by a processing system comprising a plurality of such computing devices as represented by the computing system 500. The method 400 begins in step 405 and proceeds to step 410.

At step 410, the processing system obtains operational data from a radio access network (RAN). For instance, the operational data may be obtained from base stations, baseband units, and so forth of the RAN. In one example, step 410 may be performed via a data pre-processing unit. In one example, step 410 may include filtering the operational data based on one or more configuration files (e.g., a configuration file that is particular to one or more cells of the RAN that are of interest), and appending different events into corresponding event queues.

At step 420, the processing system formats the operational data into state information and reward information for a reinforcement learning agent (RLA). In one example, step 420 may be performed via the data pre-processing unit (and/or a KPI composer/publisher unit thereof). In one example, the state information comprises a plurality of performance indicators (e.g., KPIs) such as: a throughput, an uplink volume, a downlink volume, a physical resource block (PRB) utilization, a number of active endpoint devices (e.g., at a particular cell), a handover frequency, an average endpoint device bandwidth, a geographic distribution of endpoint devices, a radio frequency distribution, and a traffic volume. In one example, the reward information may include at least one performance indicator (or KPI), such as: an endpoint device throughput, a harmonic endpoint device/user equipment (UE) throughput, a throughput differential among endpoint devices, a drop rate (e.g., a call drop rate, a data session drop rate, etc.), a retainabilty metric, an accessibility metric, and so forth. In one example, the reward information may be calculated from a plurality of the performance indicators. For instance, for a particular sub-agent of an RLA, the "reward" may be a composite metric utilizing two or more performance indicators (such as, a reward equal to 0.4 times the inverse of a call blocking rate plus 0.6 times a scaled average downlink throughput). It should be noted that the foregoing are provided by way of example only, and that in other, further, and different examples, more or less performance indicators may be utilized, performance indicators that may comprise part of the state information with respect to one or more sub-agents may alternatively or additionally comprise reward information for a different sub-agent, and so forth. In one example, the state information and the reward information are published to at least one topic (e.g., in accordance with a data streaming and distribution platform).

At step 430, the processing system processes the state information and the reward information via the reinforcement learning agent, where the reinforcement learning agent comprises a plurality of sub-agents, where each of the plurality of sub-agents comprises a respective neural network of a plurality of neural networks, where each of the plurality of neural networks encodes (e.g., learns and approximates) a respective policy for selecting at least one setting of at least one parameter of the radio access network to increase (e.g., raise or maximize) a respective predicted reward in accordance with the state information. In one example, each of the plurality of neural networks is updated in accordance with the reward information. In other words, the processing of the state information and the reward information via the reinforcement learning agent at step 430 may include updating the plurality of neural networks in accordance with the reward information. In one example, the reward information is the calculated/actual reward at a current time T. In one example, different reward information may be used for different neural networks (e.g., different sub-agents have different rewards).

In one example, the at least one setting for the at least one parameter is an "action" in accordance with the terminology of reinforcement learning. In one example, each of the plurality of sub-agents is assigned a respective value function and a respective plurality of permitted actions, where the plurality of permitted actions comprises a plurality of allowable settings for a plurality of parameters of the radio access network. In one example, each of the plurality of sub-agents may comprises a subscriber to the at least one topic (e.g., topic(s) to which the state information and the reward information may be published at step 420). In addition, in one example, the at least one topic may comprise a plurality of topics, where at least two of the plurality of sub-agents are subscribed to different topics of the plurality of topics. In other words, one sub-agent may use a different set of state information and/or reward information from another sub-agent.

In one example, step 430 may include the reinforcement learning agent updating the at least one neural network in accordance with at least one of a Q reinforcement learning process, a deep Q reinforcement learning process, a deep deterministic policy gradient process, or an asynchronous advantage actor-critic process. In one example, each neural network of the plurality of neural networks may comprise a double deep Q network, where the double deep Q reinforcement learning process comprise a memory replay learning and n-step temporal difference learning process. In another example, each neural network of the plurality of neural networks may comprise a recurrent neural network or a long short-term memory neural network.

At step 440, the processing system determines a plurality of settings (e.g., one or more settings) for one or more parameters of the radio access network via the reinforcement learning agent, wherein the reinforcement learning agent determines the one or more settings in accordance with a plurality of selections for the one or more settings via the plurality of sub-agents. For example, the plurality of settings may include a tilt angle of at least one antenna array of the radio access network, a power level of the at least one antenna array of the radio access network, a media access control (MAC) scheduling algorithm from among a plurality of available MAC scheduling algorithms, a handover offset setting from among a plurality of available handover offset settings, and so forth.

In one example, at least a first setting for at least a first of the plurality of parameters is selected via a weighted average of at least a portion of the plurality of selections for the plurality of settings, where the at least the portion of the selections relate to the at least the first of the plurality of parameters. For instance, the at least the first of the plurality of parameters may comprise a continuous space parameter. In one example, at least a first setting for at least a first of the plurality of parameters is selected via a weighted majority arbitration among at least a portion of the plurality of selections for the plurality of settings, where the at least the portion of the selections relate to the at least the first of the plurality of parameters. For instance, the at least the first of the plurality of parameters may comprise a discrete space parameter.

In still another example, each parameter may be uniquely assigned to a sub-agent, e.g., without competition for control of the parameter settings. In this case, the policies and selection of parameter settings by each sub-agent may still be informed by a reward system that accounts for how other sub-agents may act from a given state. For instance, the reinforcement learning agent (RLA) may include a plurality of critics, wherein each of the plurality of critics is for a corresponding sub-agent of the plurality of sub-agents. Each of the plurality of critics may comprise a quality function that accounts for a policy of the corresponding sub-agent and at least one action (e.g., selection(s) of setting(s) for one or more RAN parameters) of at least one other sub-agent of the plurality of sub-agents. In one example, the RLA may follow a multi-agent actor-critic (MAAC) and/or a multi-agent deep deterministic policy gradient (MADDPG) process, or modified MAAC or MADDPG process, e.g., wherein more than one sub-agent may be allowed to make a setting selection for a same parameter.

At step 450, the processing system applies the plurality of settings to the radio access network. For instance, in one example, the plurality of settings may be applied to the radio access network via a self-optimizing network controller.

Following step 450, the method 400 proceeds to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400 with respect to additional operational data for additional time periods. In one example, the method 400 may include obtaining sub-agent configurations. For instance, a network operator may define a particular use case, such as "coverage optimization," "energy savings," etc., and may define the reward and the action space (RAN parameters for which the sub-agent may make setting selections). In one example, the network operator may also define the state information, e.g., the performance indicators, or KPIs, that may be utilized by the sub-agent. In one example, the method 400 may further include defining weights for one or more sub-agents (e.g., to arbitrate among different sub-agents attempting to make setting selections for a same RAN parameter). Thus, these and other modifications are all contemplated within the scope of the present disclosure.

In addition, although not expressly specified above, one or more steps of the example method 400 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components or devices illustrated in FIG. 1 or FIG. 2, or described in connection with the example method 400 of FIG. 4 may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where hardware processor element may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for determining settings for parameters of a radio access network via a reinforcement learning agent comprising a plurality of sub-agents, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, it should be noted that the computing device may employ a plurality of hardware processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for determining settings for parameters of a radio access network via a reinforcement learning agent comprising a plurality of sub-agents (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for determining settings for parameters of a radio access network via a reinforcement learning agent comprising a plurality of sub-agents (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor, operational data from a radio access network;
   formatting, by the processing system, the operational data into state information and reward information for a reinforcement learning agent;
   processing, by the processing system, the state information and the reward information via the reinforcement learning agent, wherein the reinforcement learning agent comprises a plurality of sub-agents, wherein each of the plurality of sub-agents comprises a respective neural network of a plurality of neural networks, wherein each of the plurality of neural networks encodes a respective policy for selecting at least one setting of at least one parameter of the radio access network to increase a respective predicted reward in accordance with the state information, wherein each of the plurality of neural networks is updated in accordance with the reward information;
   determining, by the processing system, a plurality of settings for a plurality of parameters of the radio access network via the reinforcement learning agent, wherein the reinforcement learning agent determines the plurality of settings in accordance with a plurality of selections for the plurality of settings via the plurality of sub-agents, wherein the plurality of settings includes the at least one setting and the plurality of parameters includes the at least one parameter; and
   applying, by the processing system, the plurality of settings to the radio access network.

2. The method of claim 1, wherein the processing the state information and the reward information via the reinforcement learning agent comprising:
   updating the plurality of neural networks in accordance with the reward information.

3. The method of claim 1, wherein the plurality of settings for the plurality of parameters comprises at least one of:
   a tilt angle of at least one antenna array of the radio access network; or
   a power level of the at least one antenna array of the radio access network.

4. The method of claim 1, wherein the plurality of settings for the plurality of parameters comprises a media access control scheduling algorithm from among a plurality of available media access control scheduling algorithms.

5. The method of claim 1, wherein the plurality of settings for the plurality of parameters comprises a handover offset setting from among a plurality of available handover offset settings.

6. The method of claim 1, wherein the state information comprises a plurality of performance indicators that include at least two of:
   a throughput;
   an uplink volume;
   a downlink volume;
   a physical resource block utilization;
   a number of active endpoint devices;
   a handover frequency;

an average endpoint device bandwidth;
a geographic distribution of endpoint devices;
a radio frequency distribution; or
a traffic volume.

7. The method of claim 1, wherein the reward information comprises at least one performance indicator, including at least one of:
an endpoint device throughput;
a harmonic user equipment throughput;
a throughput differential among endpoint devices;
a drop rate;
a retainabilty metric; or
an accessibility metric.

8. The method of claim 7, wherein the reward information is calculated from a plurality of the at least one performance indicator.

9. The method of claim 1, wherein the reinforcement learning agent updates the plurality of neural networks in accordance with at least one of:
a Q reinforcement learning algorithm;
a double deep Q reinforcement learning algorithm;
a deterministic policy gradient algorithm; or
an asynchronous advantage actor-critic algorithm.

10. The method of claim 1, wherein each neural network of the plurality of neural networks comprises a double deep Q network, wherein the double deep Q network comprises a memory replay learning and n-step temporal difference learning process.

11. The method of claim 1, wherein each neural network of the plurality of neural networks comprises:
a recurrent neural network; or
a long short-term memory neural network.

12. The method of claim 1, wherein the plurality of settings is applied to the radio access network via a self-optimizing network controller.

13. The method of claim 1, wherein at least a first setting for at least a first of the plurality of parameters is selected via a weighted average of at least a portion of the plurality of selections for the plurality of settings, wherein the at least the portion of the selections relates to the at least the first of the plurality of parameters.

14. The method of claim 1, wherein at least a first setting for at least a first of the plurality of parameters is selected via a weighted majority arbitration among at least a portion of the plurality of selections for the plurality of settings, wherein the at least the portion of the selections relates to the at least the first of the plurality of parameters.

15. The method of claim 1, wherein the reinforcement learning agent includes a plurality of critics, wherein each of the plurality of critics is for a corresponding sub-agent of the plurality of sub-agents, wherein each of the plurality of critics comprises a quality function that accounts for a policy of the corresponding sub-agent and at least one action of at least one other sub-agent of the plurality of sub-agents.

16. The method of claim 1, wherein each of the plurality of sub-agents is assigned:
a respective value function; and
a respective plurality of permitted actions, where the plurality of permitted actions comprises a plurality of allowable settings for the plurality of parameters of the radio access network.

17. The method of claim 16, wherein the state information and the reward information are published to at least one topic, wherein each of the plurality of sub-agents comprises a subscriber to the at least one topic.

18. The method of claim 17, wherein the at least one topic comprises a plurality of topics, wherein at least two of the plurality of sub-agents are subscribed to different topics of the plurality of topics.

19. A non-transitory computer-readable medium storing instructions which, when executed by a processing system including at least one processor, cause the processing system to perform operations, the operations comprising:
obtaining operational data from a radio access network;
formatting the operational data into state information and reward information for a reinforcement learning agent;
processing the state information and the reward information via the reinforcement learning agent, wherein the reinforcement learning agent comprises a plurality of sub-agents, wherein each of the plurality of sub-agents comprises a respective neural network of a plurality of neural networks, wherein each of the plurality of neural networks encodes a respective policy for selecting at least one setting of at least one parameter of the radio access network to increase a respective predicted reward in accordance with the state information, wherein each of the plurality of neural networks is updated in accordance with the reward information;
determining a plurality of settings for a plurality of parameters of the radio access network via the reinforcement learning agent, wherein the reinforcement learning agent determines the plurality of settings in accordance with a plurality of selections for the plurality of settings via the plurality of sub-agents, wherein the plurality of settings includes the at least one setting and the plurality of parameters includes the at least one parameter; and
applying the plurality of settings to the radio access network.

20. An apparatus comprising:
a processing system including at least one processor; and
a computer-readable medium storing instructions which, when executed by the processing system, cause the processing system to perform operations, the operations comprising:
obtaining operational data from a radio access network;
formatting the operational data into state information and reward information for a reinforcement learning agent;
processing the state information and the reward information via the reinforcement learning agent, wherein the reinforcement learning agent comprises a plurality of sub-agents, wherein each of the plurality of sub-agents comprises a respective neural network of a plurality of neural networks, wherein each of the plurality of neural networks encodes a respective policy for selecting at least one setting of at least one parameter of the radio access network to increase a respective predicted reward in accordance with the state information, wherein each of the plurality of neural networks is updated in accordance with the reward information;
determining a plurality of settings for a plurality of parameters of the radio access network via the reinforcement learning agent, wherein the reinforcement learning agent determines the plurality of settings in accordance with a plurality of selections for the plurality of settings via the plurality of sub-agents, wherein the plurality of settings includes the at least one setting and the plurality of parameters includes the at least one parameter; and applying the plurality of settings to the radio access network.

\* \* \* \* \*